(12) United States Patent
Kock

(10) Patent No.: US 6,442,624 B1
(45) Date of Patent: Aug. 27, 2002

(54) CONFIGURATION AND METHOD FOR PROVIDING DATA USING A COMBINATION OF HARDWIRED AND PROGRAMMABLE VALUES

(75) Inventor: Ernst-Josef Kock, Kirchseeon (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/240,715

(22) Filed: Jan. 29, 1999

(30) Foreign Application Priority Data

Jan. 29, 1998 (DE) .......................... 198 03 484

(51) Int. Cl.[7] .......................... G06F 3/00; G06F 13/00
(52) U.S. Cl. .......................... 710/8; 710/104
(58) Field of Search .............. 710/104, 8–19; 713/1, 2, 100

(56) References Cited

U.S. PATENT DOCUMENTS

| | | | | | |
|---|---|---|---|---|---|
| 5,655,148 A | * | 8/1997 | Richman et al. | ................. | 710/8 |
| 5,881,281 A | * | 3/1999 | Gates et al. | ................. | 713/1 |
| 5,974,486 A | * | 10/1999 | Siddappa | ................. | 710/53 |
| 6,195,593 B1 | * | 2/2001 | Nguyen | ................. | 700/97 |

OTHER PUBLICATIONS

"Kontaktkarte — PC–Evaluation–Board für Schaltungen mit PCI–Bus–Interface", Oliver Rovini, ELRAD, 1997, vol. 3, pp. 42–47.

* cited by examiner

*Primary Examiner*—Sumati Lefkowitz
(74) *Attorney, Agent, or Firm*—Laurence A. Greenberg; Werner H. Stemer; Ralph E. Locher

(57) ABSTRACT

An configuration and a method are described for providing data for characterization of various units on a bus system. The configuration and method are distinguished by the fact that some of the data which characterize a unit are stored in memory elements having a variable content, and in that the rest of the data which characterize the unit are defined by hardware. In consequence, the complexity for providing the data which characterize a unit can be reduced to a minimum.

12 Claims, 1 Drawing Sheet

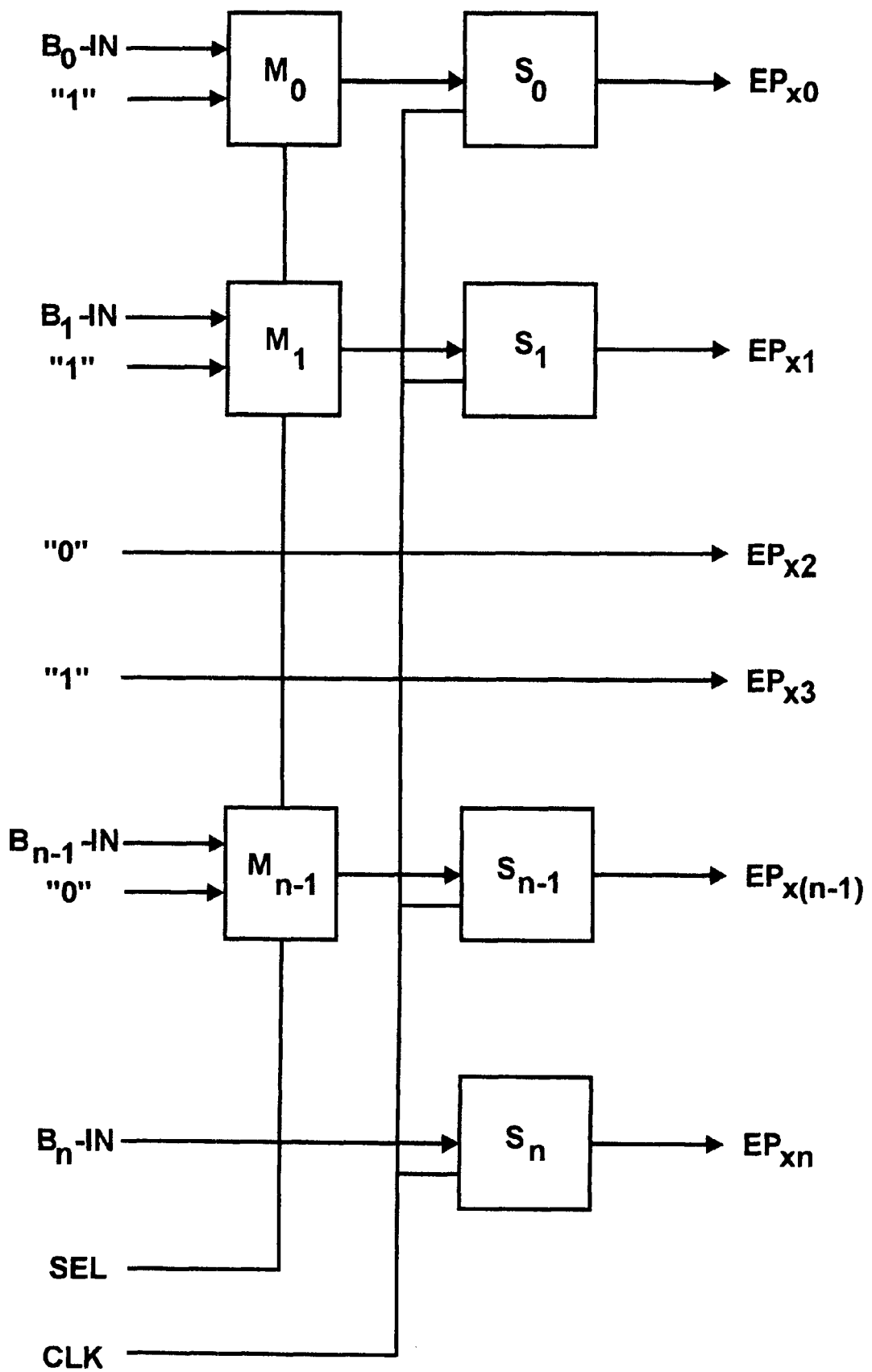

CONFIGURATION AND METHOD FOR PROVIDING DATA USING A COMBINATION OF HARDWIRED AND PROGRAMMABLE VALUES

BACKGROUND OF THE INVENTION

Field of the Invention

The present invention relates to a configuration and a related method wherein data are provided for characterizing various units on a bus system.

Such configurations and methods are required, for example but not exclusively, for the Universal Serial Bus (USB). The USB is a bus system designed in particular for use in computers. It is mainly used there for communication between the computer and peripherals connected to it, such as the mouse, the printer, and the like.

The units (end points) which are connected to the USB each have a data set which characterizes the respective unit and which contains various items of information about the respective unit itself (its address, its nature, etc) and about the communication with other units. The data set which characterizes the respective units is used in order to confirm whether the relevant unit is being addressed by a received data request, and in what way, if necessary, it should react to the data request.

Experience has shown that, particularly if the relevant unit is intended to be usable or operable in a flexible manner, the provision of the data which characterize a unit is associated with relatively high complexity.

SUMMARY OF THE INVENTION

It is accordingly an object of the invention to provide a configuration and method for providing data characterizing various units at a bus system, which overcomes the above-mentioned disadvantages of the heretofore-known devices and methods of this general type and which reduces to a minimum the complexity for providing the data which characterize a unit.

With the foregoing and other objects in view there is provided, in accordance with the invention, a configuration and a method for providing data characterizing various units on a bus system, comprising:

a plurality of memory elements having a variable content and receiving and storing some data characterizing a unit on a bus system; and hardware-defined connections determining a remainder of the data characterizing the unit on the bus system.

In other words, some of the data which characterize a unit are stored in memory elements having a variable content, and the rest of the data which characterize the unit are defined by hardware.

If a hardware definition is provided for those data items which are not allowed to be changed for the unit characterized by them or where such changes make no sense, and storage in memory elements having a variable content is provided for those data items which it may be necessary to change or may be worth changing, then the relevant unit can be used and operated flexibly and at the same time—in particular owing to the fact that the number of memory elements can be kept low—can be physically small and can be operated with low power consumption and reliably (without being susceptible to defects).

In consequence, the complexity for providing the data which characterize a unit (an end point) on a bus system can be reduced to a minimum.

In accordance with an added feature of the invention, the data stored in the memory elements are generated in the unit characterized by the data, or supplied from an external memory.

In accordance with an additional feature of the invention, some of the data characterizing the unit are selectively formed by variable data or by data with a permanently set value.

In accordance with another feature of the invention, multiplexers are connected upstream or downstream to selected ones of the memory elements for selectively passing through the variable data or the data with the permanently set value.

In accordance with a further feature of the invention, the hardware-defined data received by the configuration are variable data.

In accordance with again an added feature of the invention, the data stored in the memory elements are coded data which, before being output, are converted into the data that characterize the respective unit.

In accordance with again a further feature of the invention, the hardware data and/or data set to permanent values are selected such that an absence of the unit characterized by the data is signaled by the data to the receiver thereof.

In accordance with a concomitant feature of the invention, the unit characterized by the data is an end point of a Universal Serial Bus System.

Other features which are considered as characteristic for the invention are set forth in the appended claims.

Although the invention is illustrated and described herein as embodied in an configuration and method for providing data for characterization of various units on a bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE of the drawing is a schematic of a configuration for providing data characterizing a unit connected to a bus system.

DESCRIPTION OF THE PREFERRED EMBODIMENTS

The configuration which is described in more detail in the following text and the method which is described in more detail in the following relate specifically to data provided for the characterization of units (end points) on a Universal Serial Bus System (USB System). However, it will be readily understood that the novel configuration and the related method can also be used with other bus systems.

The configuration is a component of the unit which is characterized by the data provided by the configuration; the method is carried out in this unit.

The units are, for example, the mouse or the printer of a computer or parts thereof.

The data which characterize a unit (the data provided by the described configuration and the described method) are used predominantly to confirm whether the relevant unit is being addressed by a received data request, and in what way it should react, if necessary, to the data request. The data (the data which characterize the relevant unit) can alternatively or additionally be used for any other purpose as well. Irrespective of this, the data which characterize a unit are partially stored in memory elements having a variable content and are partially defined by hardware in the case of the configuration described above and the method described above. In this case, a hardware definition is provided for those data items which are not allowed to be changed for the relevant unit or where such changes make no sense, and storage in memory elements having a variable content is provided for those data items which it may be necessary to change or may be worth changing.

The figure illustrates one possible practical implementation of the novel configuration.

The data which characterize a unit x, whose component is the shown configuration, are denoted by $EP_{x0}$ to $EP_{xn}$ in the figure.

The data $EP_{x2}$ and $EP_{x3}$ are defined by hardware, in which $EP_{x2}$ is permanently set at low level (0) and $EP_{x3}$ is permanently set at high level (1).

The data $EP_{x0}$, $EP_{x1}$, $EP_{x(n-1)}$ and $EP_{xn}$ are stored in memory elements having a variable content. The memory elements are denoted by $S_0$, $S_1$, $S_{n-1}$ and $S_n$ in the figure and, in the example under consideration, are formed by flipflops. However, it will be understood that the memory elements may also be formed by any other memory devices.

Each memory element $S_0$, $S_1$, $S_{n-1}$ and $S_n$ has an input terminal for application of the data to be stored in it, and a clock signal terminal for application of a clock signal CLK. The memory elements are designed to receive and to store the signal which is applied to the input connection for a predetermined level or with a predetermined edge of the clock signal CLK.

The data item $B_n$-IN which is applied to the input connection of the memory element $S_n$ is a variable signal which is produced, for example, by a program that is executed in the relevant unit, or is supplied from outside the configuration (for example from an external memory device). The data that are applied to the input connections of the memory elements $S_0$, $S_1$ and $S_{n-1}$ are data which are passed through from multiplexers $M_0$, $M_1$ and $M_{n-1}$ or similar switching devices.

Two signals are applied to each of the multiplexers, of which signals one is in each case passed through to the input connection of the downstream memory element. Of the two signals, one is a variable signal ($B_0$-IN in the case of $M_0$, $B_1$-IN in the case of $M_1$, and $B_{n-1}$-IN in the case of $M_{n-1}$), and the other is a signal which is permanently at low level (in the case of $M_{n-1}$) or at high level (in the case of $M_0$ and $M_1$). The multiplexer control signal is used to determine which of the signals which are applied to the multiplexers is output to the downstream memory elements.

A configuration set up as shown in the FIGURE and described with reference to the FIGURE, for providing data for characterization of various units on a bus system, was found to be advantageous from two points of view: First, there is no need to provide a memory element for all the data which characterize the relevant unit. Second, the data which are stored in a memory element can be selected from various data.

The fact that the configuration is designed to store only some of the data in memory elements having a variable content has the advantage that the number of memory elements to be provided can be maintained at a low number. In consequence, the configuration can be physically small and can be operated with a low power level and reliably (less susceptible to defects). On the other hand, minimizing the number of memory elements does not result in any limitation, or in any case no significant limitation, of the usefulness and operation of the unit containing the configuration since, in fact, the data items for which no memory elements are provided are only those which may not be changed or where there is no sense in changing them.

The fact that the data which are stored in a memory unit can be selected from various data has the advantage that the data which characterize the given conditions can be matched to specific situations with minimal effort. This is highly advantageous in particular when certain data items can no longer be selected freely after a change in the mode of operation of the unit (for example when switching over between the so-called full speed device mode and the so-called low speed device mode), but must be set to specified values. In the ideal case, such a changeover is carried out just by switching a single signal, namely the multiplexer control signal SEL, that is to say very easily and quickly.

The configuration which is shown in the FIGURE and is described with reference to the FIGURE can be varied in many ways.

Thus, for example, it is possible to provide for the configuration to be designed such that, when the existing memory elements are being loaded with the data which characterize the relevant unit, the configuration receives or appears to receive variable data even for those portions of the data which are defined by hardware or are set to fixed values, but without having to use such data further. In this way, the configuration can be made compatible with configurations in which memory elements are provided for all the data.

Furthermore, it is possible to provide, particularly, for the data which are provided for storage in the memory elements not to be the data which must actually be output, but to be coded data which, before they are output from the configuration, are first converted into the data which characterize the relevant unit, for example using tables or other association rules. In consequence, it is possible, as a rule for the number of memory elements to be even less than is already the case anyway.

Furthermore, there is also no limitation on the said multiplexers or comparable switching devices having to be arranged upstream of the memory elements, as shown in the FIGURE. They can also be connected downstream of the memory elements, in which case the output signal from the memory element and the signal which is set to a fixed value are then applied as input signals to the multiplexer, and only the variable signal is ever supplied as the input signal to the memory element, irrespective of the chosen operating mode; the output signal $EP_{xx}$ from the configuration is then the output signal from the multiplexer. If and for as long as the signal set to a fixed value is output from the multiplexer, it is possible to switch off the memory element which is provided for storing the variable signal, or to operate it only to a limited extent (for example without the clock signal CLK having to be applied to it any longer), as a result of which the configuration can be operated more conservatively and with a lower power consumption.

If the signals which are set to a fixed value are applied to the set or reset input of the flipflops which in this case form the memory elements and the clock signal CLK is not applied to the relevant memory elements for the time during which the signal which is set to the fixed value is intended to be output, the multiplexers may even be dispensed with.

It may also be found to be advantageous if such data are used to signal (simulate) the absence of the unit which is characterized by the data. It is thus possible in a simple manner to prevent, with high probability, a malfunction in the unit which is characterized by the data automatically leading to a failure or blocking of the entire system.

Irrespective of the details of their practical implementation, the described configuration and the described method allow the complexity for providing the data which characterize a unit on a bus system to be kept low.

I claim:

1. A configuration for providing data characterizing various units on a bus system, comprising:

a plurality of memory elements having a variable content and receiving and storing some data characterizing a unit on a bus system;

hardware-defined connections determining a remainder of the data characterizing the unit on the bus system; and the data stored in said memory elements being:
   generated in the unit characterized by the data; and
   coded data which, before being output, are converted into the data characterizing the respective unit.

2. The configuration according to claim 1, which further comprises an external memory device connected to supply the data characterizing the unit.

3. A configuration for providing data characterizing various units on a bus system, comprising:

a plurality of memory elements having a variable content and receiving and storing some data characterizing a unit on a bus system;

hardware-defined connections determining a remainder of the data characterizing the unit on the bus system;

some of the data characterizing the unit being selectively formed by variable data or by data with a permanently set value; and at least one of the hardware data and the data set to permanent values being selected such that an absence of the unit characterized by the data is signaled by the data.

4. The configuration according to claim 3, which further comprises multiplexers connected to selected ones of said memory elements for selectively passing through the variable data or the data with the permanently set value.

5. The configuration according to claim 1, wherein the hardware-defined data received by the configuration are variable data.

6. The configuration according to claim 1, wherein the unit characterized by the data is an end point of a Universal Serial Bus System.

7. A method of providing data for characterizing various units on a bus system, which comprises:

storing some data characterizing a unit on a bus system in memory elements having a variable content;

producing the data stored in the memory elements by a program running in the unit being characterized by the data; and storing coded data in the memory elements and, prior to outputting the data, converting the data into the data characterizing the respective unit; and defining a rest of the data characterizing the unit by hardware.

8. The method according to claim 7, which comprises supplying the data stored in the memory elements from an external memory device.

9. A method of providing data for characterizing various units on a bus system, which comprises:

storing some data characterizing a unit on a bus system in memory elements having a variable content;

selectively forming some of the data characterizing the unit by variable data or by data with a permanently set value;

defining a rest of the data characterizing the unit by hardware; and defining at least one of the hardware-defined data and the data set to permanent values such that an absence of the unit characterized by the data is signaled by the data.

10. The method according to claim 9, which comprises connecting selected memory elements upstream or downstream of a multiplexer and selectively passing through the multiplexer the variable data or the data with the permanently set value.

11. The method according to claim 7, which comprises receiving variable data for the hardware-defined portions of the data.

12. The method according to claim 7, which comprises characterizing with the data an end point of a Universal Serial Bus System.

* * * * *